United States Patent [19]

Birkle et al.

[11] Patent Number: 4,701,248
[45] Date of Patent: Oct. 20, 1987

[54] APPARATUS FOR ELECTROLYTIC SURFACE TREATMENT OF BULK GOODS

[75] Inventors: Siegfried Birkle, Hoechstadt; Johann Gehring, Spardorf, both of Fed. Rep. of Germany

[73] Assignee: Siemens Aktiengesellschaft, Berlin & Munich, Fed. Rep. of Germany

[21] Appl. No.: 880,080

[22] Filed: Jun. 30, 1986

[30] Foreign Application Priority Data

Jul. 9, 1985 [DE] Fed. Rep. of Germany ....... 3524510
May 15, 1986 [DE] Fed. Rep. of Germany ....... 3616436

[51] Int. Cl.$^4$ ............................................. C25D 17/16
[52] U.S. Cl. .................................................. 204/201
[58] Field of Search ........................ 204/201, 222, 223

[56] References Cited

U.S. PATENT DOCUMENTS

| 3,292,775 | 12/1966 | White | 198/220 |
| 3,649,490 | 3/1972 | Nolan et al. | 204/201 |
| 3,826,355 | 7/1974 | Faust | 198/220 BA |
| 4,253,916 | 3/1981 | Kobayashi et al. | 204/14.1 |
| 4,427,518 | 1/1984 | de Vries et al. | 204/201 |

FOREIGN PATENT DOCUMENTS

| 0070011 | 1/1983 | European Pat. Off. | 204/201 |
| 594072 | 12/1977 | Switzerland | 204/201 |

OTHER PUBLICATIONS

Edner et al, "Neue Erkenntnisse mit dem Vibrobot-Verfahren", Galvanotechnik, vol. 75, No. 11, 1984, p. 1399.

Primary Examiner—T. M. Tufariello
Attorney, Agent, or Firm—Hill, Van Santen, Steadman & Simpson

[57] ABSTRACT

An apparatus for electrolytic surface treatment of bulk goods includes a tank for the acceptance of the treatment bath, an arrangement for connecting the goods to be treated to at least one pole of an electrical source, an electrode disposed in the bath connected to the other pole opposite the one pole, a vibratory conveyor having a helically ascending conveyor track and an arrangement for receiving the goods from the end of the conveyor track and returning them to the beginning of the track by a return device so that they will pass through the bath at least one more time. The arrangement for receiving includes a switch arrangement for selectively shifting the goods discharged from the end of the track between the return device and a discharge station. The apparatus is particularly suitable for electro-deposition of aluminum from an aprotic, oxygen-free and water-free, aluminum-organic electrolyte.

20 Claims, 1 Drawing Figure

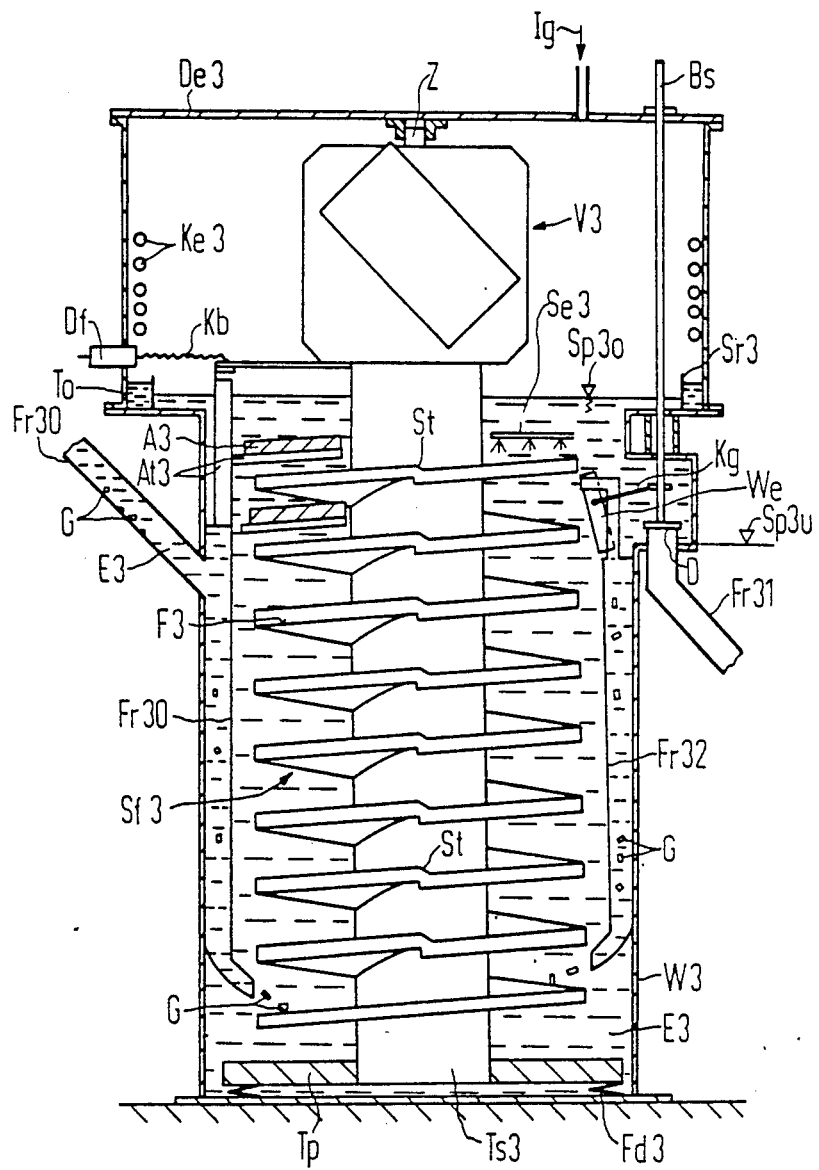

APPARATUS FOR ELECTROLYTIC SURFACE TREATMENT OF BULK GOODS

BACKGROUND OF THE INVENTION

The present invention is directed to an apparatus for electrolytical surface treatment of bulk goods, particularly for the electro deposition of aluminum from an aprotic, oxygen-free and water-free, aluminum-organic electrolyte. The apparatus comprises a tank for the acceptance of the treatment bath, an arrangement for contacting the goods with one pole of an electrical source, at least one electrode arranged in the treatment bath and having the opposite polarity of the one pole and at least one vibratory conveyor comprising a helically ascending conveyor track for transporting of the goods through the treatment bath.

Aluminum deposited from an aprotic, oxygen-free and water-free, aluminum-organic electrolyte is distinguished by its ductility, low number of pores, corrosion resistance and ability to be anodized. Since the access of air will effect a considerable diminution of the conductivity and the useful life of these electrolytes due to the reaction of the electrolytes with atmospheric oxygen and atmospheric humidity, the electro-plating must be undertaken in a treatment apparatus which operates under air exclusion or a protective atmosphere. In order for the access of air to be prevented during loading and unloading, these treatment facilities operating under an air exclusion utilize admission and discharge locks. These admission and discharge locks are fashioned as gas locks, as liquid locks, or as a combined gas-liquid lock and are equipped with conveyor means for conducting the goods to be treated through the locks.

U. S. Pat. No. 4,427,518, which is based on the same German application as European Pat. No. 0,070,011, discloses an apparatus or facility for the electro deposition of metal, wherein bulk goods to be electro-plated are introduced into an electro-plating drum rotatably arranged in an electro-plating tank. The introduction of the goods is by an admissions station provided with conveying means. The goods are then conducted through the electro-plating drum, which is provided with a screw conveyor on an inside wall and then discharged at an exit station which is provided with a conveyor means. The electro-plating drum, which is provided with perforations, is, thereby, connected as a cathode, whereas the anode is arranged in the inside of the electro-plating drum. For the electro-deposition of aluminum from oxygen-free and water-free, aluminum-organic electrolyte, the electro-plating drum is constructed to be closed gas tight and the space lying above the electrolyte level is charged with an inert gas. In addition, the admission and exit stations for the apparatus are additionally equipped with liquid locks.

In mass electro-plating, the bulk goods to be electroplated must be held together during the galvanic processing so that every individual part is electrically contacted. On the other hand, the goods to be electroplated should be spread out as far as possible so that the metal deposition can occur on as large as possible surface of the goods and an optimum uniform current density is guaranteed on all parts. Another essential precondition for achieving faultless metal coatings having a uniform layer thickness is an adequate mixing of the goods to be electro-plated during the galvanic processing. In what we refer to as a suspension-electro-plating device, this is achieved by transmitting an oscillating rotational motion onto the goods vessel filled with the goods to be electro-plated and the vessel is immersed into the electrolyte (see the announcement in *Galvanotechnik* Vol. 75, 1984, No. 11, page 1399). The electrolyte exchange is also improved at the same time by means of an oscillatory motion of the vessel containing the goods. Given an apparatus or facility comprising an electro-plating drum, rotation of the drum suffices for the moving and mixing of the goods to be electroplated. The individual parts are conveyed upward to a greater or lesser distance toward the top dependent on the form and wall friction of the drum and then roll or slide back down. An apparatus for mass electro-plating should also be equipped with conveyor means for transporting the goods to be electro-plated through the electrolyte with either a continuous or interval-wise admission and removal of the goods for electro-plating being enabled by the conveyor means in combination with corresponding admission and exit stations. Finally, both the motion of the goods, and the mixing as well as the transporting of the goods through the bath of the electrolyte should be undertaken so that a gentle treatment of the goods is guaranteed and sensitive parts are likewise not mechanically damaged during the galvanic processing.

An apparatus or system which is disclosed in U.S. Pat. No. 3,649,490 is used for electrolytic surface treatment of bulk goods and largely meets the demands mentioned hereinabove. A vibratory conveyor having a helically ascending conveying track is provided for the transport of the goods to be electro-plated through the electrolyte. However, the helical conveying track secured to a central carrying column and suspended into the treatment bath from above can only be realized with a limited length for structural reasons and for reasons of stability. For this reason, the dwell time of the bulk goods in the treatment bath is too short in many applications for electrolytic surface treatment.

U.S. Pat. No. 4,253,916 discloses an electro-plating apparatus or system for bulk goods, wherein an annularly designed tank is placed in vibration and the goods on the helical floor of the tank are thereby constantly kept in motion. Given this electro-plating facility, the dwell time of the goods in the treatment bath can be adapted to the respective requirements. However, since the tank together with the treatment bath contained therein and the bulk goods must be placed in vibration, only a slight structural height with a correspondingly low throughput or output can be realized.

In Swiss Pat. No. 594 072, another type of electroplating apparatus for bulk goods is disclosed. In this apparatus, the galvanic metal deposition is undertaken on a helical ramp arranged in the treatment bath. This helical ramp is placed in vibration with the assistance of a vibrator. The upper turns of the ramp serves as a helical conveyor which transports the goods up for better mixing, so that they can in turn fall back onto the ramp. Since the space of the helical ramp is tightly restricted, only a low output or throughput can be obtained. Moreover, the removal of the completely galvanized parts from the ramp involves considerable cost.

The problems, which were recited above, with regard to mass electro-plating also occur in the same way, or at least in analogous ways, in other processes for electrolytic treating of bulk goods. Examples of other processes of electrolytic treating of bulk goods include electrolytic pickling in acid or caustic solutions, electrolytic degreasing in alkaline baths and electrolytic polishing. Dependent on the type of electrolytic surface treatment, the bulk goods are either connected to a cathode or an anode, for example, in electrolytic polishing, the goods are connected to an anode.

SUMMARY OF THE INVENTION

The object of the present invention is to improve an apparatus or system for use in electrolytic treatment of bulk goods which system will have adequately high output and a dwell time which can be adapted to the respective requirements of the treatment. The system also has a guaranteed simple removal of the completed goods from the treatment bath.

This object is achieved in accordance with an improvement in an apparatus for electrolytic surface treatment of bulk goods, which apparatus includes a tank for the acceptance of the treatment bath, means for contacting the goods with one pole of an electrical or voltage source, at least one electrode arranged in the treatment bath and having an opposite polarity to the polarity of the one pole and at least one vibrator conveyor having a helically ascending conveyor track for transporting of the goods through the treatment bath. The improvements are that the apparatus includes return means for returning the bulk goods from adjacent the output of the vibratory conveyor to a starting region so that the goods can be passed through the bath more than one time. Given a connected return means, the goods can be subjected to an electrolytic surface treatment in a circulating operation, which has extremely good mixing until the desired effect has occurred. Subsequently, the return means is uncoupled so that completely treated goods can be discharged in a normal way from the apparatus.

The switching between the circulation and discharge can be accomplished in an especially simple way when the return means is connected to the end of the vibratory conveyor via a switch. In this case, it is then also particularly favorable when the switch can be switched from depositing the goods into the return means to a second position depositing goods in a downpipe of a discharge station of the apparatus.

When the return means is constructed as a gravity conveyor, then additional conveyor means for the return can be eliminated. Hereto, the gravity conveyor is expediently formed by a downpipe, which provides gentle treatment of the goods and also improves the mixing thereof.

Given the employment of return means, it is preferably provided that the level of the treatment bath can be lowered to a lower level after the conclusion of the circulating operation which was established by the use of the return means. As a result thereof, the full conveyor path of the vibratory conveyor can be exploited for the electrolytic surface treatment. The discharge phase then begins after the lowering of the electrolyte. The drops of electrolyte adhering to the goods above the lowered bath level are then hurrled off in this discharge phase by vibration of the conveyor track and, thus, an extremely slight entrainment of electrolyte will occur.

In order to prevent the escape of the electrolyte in an optimum simple way given employment of a downpipe at the discharge station, the level of the treatment bath can be lowered to a level lying below the upper opening of the downpipe of the discharge station. The upper opening of the downpipe at the discharge station can be closed by a cover. The switching between the circulating operation of the discharge operation can be accomplished in an especially simple way and wherein the switch can be thrown together with the opening operation for the cover for the opening of the downpipe at the discharge station or discharge lock.

As seen in the conveying direction, the conveying track of the vibratory conveyor can also comprise at least one descending step. Such a step then acts as a stumbling step which leads to a further enhancement of the mixing given gentle treatment of the goods.

It is provided in a further, preferred development of the invention that the conveying or conveyor track of the vibrator conveyor is conducted out above the level of the treatment bath. Drops of the electrolyte still adhering to the goods above the bath level are then hurrled off by the vibrations so that an extremely slight entrainment of electrolyte will occur.

The facility of the invention can be operated under a protective atmosphere which will exclude air with a relatively slight additional cost. For example, the apparatus can be used for electro-deposition of aluminum from an oxygen-free and water-free, aluminum-organic electrolyte. In this case, the tank can be closed gas-tight whereas the space above the treatment bath can be charged with an inert gas, such as nitrogen. In addition to the advantages also obtainable in an aqueous treatment baths, the employment of the vibratory conveyor as a conveying means has the additional advantage that no drive shafts extend out of the treatment bath and need to be sealed. Such a sealing of rotating parts, which is required, for example, when utilizing conveyor belts and other known conveyor means, is definitely to be considered problematically given the high demands raised given, for example, aprotic bath fluids. An entrainment of gasses or vapors via the bulk goods is also reliably excluded in an apparatus operating with the air exclusion due to the vibration of the vibratory conveyor.

When the conveying track of the vibratory conveyor is conducted up above the bath level, then a spray means for spraying a solvent compatible with the treatment bath can be arranged above the level of the treatment bath. The treated goods can be freed of adhering electrolyte residues with the assistance of the spraying means and can thus be cleaned. Since the electrolyte residues are then returned to the bath, the entrainment of the electrolyte is further reduced. When a condensation means is arranged in the space above the treatment bath, then the solvent condensing at the condensation means can be supplied to the spray means and a closed circulation of the solvent enables an unchanging solvent concentration in the electrolyte.

In accord with further preferred embodiments of the invention, the conveying track of the vibratory conveyor can be placed in vibration via at least one carrying column. In addition to the transmission of the vibrations, such carrier column then also fills the job of a carrying structure for the conveying track. A helically ascending conveying track is then secured to a centrally arranged carrying column in an especially simple and space saving manner.

The vibrations excitation is then effected with a low cost and the carrying column is arranged on a carrying plate vibrationally seated in the tank and carrying a vibrator. As a result of the incorporation of the overall vibration creating in the tank, the problems of sealing drive means which extend out of the tank are eliminated which is especially advantageous given an apparatus which is designed to operate under either the exclusion of air or under a protective atmosphere.

It is provided in accordance with a further development of the invention that the vibrator carries a trunnion at its upper end and that the trunnion is rotatably centered and raisable and lowerable at least in a slight degree. Given a facility operating under a protective air atmosphere or air exclusion, it is expedient for the trunnion to be centered in the upper cover of the tank. The centering of the vibrator on the basis of the trunnion protects the overall facility against uncontrollable vibrations which may potentially occur.

Additional advantages and object of the present invention will be readily seen from the following illustration and description of the preferred embodiment.

BRIEF DESCRIPTION OF THE DRAWINGS

The figure is a vertical cross sectional view of an apparatus in accordance with the present invention.

DESCRIPTION OF THE PREFERRED EMBODIMENTS

The principles of the present invention are particularly useful in a tower-like apparatus generally indicated at 101 in the FIG., which apparatus is useful for electrodeposition of aluminum. The apparatus 101 has a circular cylindrical tank W3 which is closed gas-tight with the assistance of a cover De3 and has its base supported on the ground. An aprotic oxygen-free and water-free, aluminum-organic electrolyte or bath E3 is situated in the tank W3 and has an upper liquid level Sp3o. The region of the tank W3 above the level Sp3o of the electrolyte or bath E3 is charged with inert gas, for example, nitrogen, whereby the feed of this inert gas in an inlet is indicated by the arrow Ig.

The goods G, which are to be aluminized and, for example, include bolts, nuts, screws, spacer bushings and the like, are introduced into the tank W3 by an admission lock (not shown in the drawing) which is connected to a downpipe Fr30 which forms feed means and extends to a position adjacent a lower end of a conveyor track F3 of the vibratory conveyor, which is generally indicated at Sf3, and is arranged in the tank W3. The admission or entrance lock can be constructed in a conventional manner such as disclosed in the above mentioned U.S. patents or can have the structure disclosed in our copending U.S. patent application Ser. No. 880,077, filed June 30, 1986.

The conveying track F3 is a helically ascending track designed as a vibrating conveyor and the goods are transporting by the track up through the bath of electrolyte E3 and then fall onto a switch We fashioned as a short channel. On the way up, the goods G pass a plurality of descending steps St of the conveyor track F3 whose step height is dimensioned so that the goods turn when they fall over the step to improve the mixing of the goods.

Given the illustrated position of the switch We, the goods G proceed into a downpipe Fr32 which serves as a return means to return the goods G to the lower most turn of the conveyor track F3. Given the illustrated position of the switch We, the goods are, thus, conveyed through the electrolyte E3 in circulation and for more than one pass or time.

The switch We has a second position discharging into a downpipe Fr31 which is a discharge pipe or station for the apparatus. Before switching the switch We to the second position, the level Sp3o of the electrolyte E3 is lowered to a lower level Sp3u, which lies below an upper opening of the downpipe Fr31. The lowering of the electrolyte level, which is not shown in the drawings, can be undertaken utilizing a circulation pump which removes the electrolyte and places it into a storage device which is charged with the inert gas.

In order to prevent the outflow of the electrolyte E3 through the downpipe Fr31 of the discharge station, when the electrolyte is at a level such as Sp3o, the upper opening of the downpipe or discharge pipe Fr31 is closed by a cover D which can be moved from a closed position to the open position either pneumatically or hydraulically by an actuation rod Bs which extends out of the cover De3. The switch We is hinged to the actuation rod Bs by a coupling element Kg so that the switch is thrown or pivoted to the second position when the cover D is lifted off of the opening for the downpipe Fr31. In the second position, goods will then fall into the downpipe Fr31 and proceed into a discharge lock (not shown in the drawings) but which can be of a structure such as disclosed in the above mentioned copending application or the above mentioned U.S. patents.

The helical conveying track F3 is fastened to a centrally arranged carrying column Ts3, whose lower end is vibrationally seated on the floor or bottom of the tank W3 by a carrying plate Tp and a plurality of springs Fd3. The upper end of the column Ts3 carries a vibrator V3 in the region lying above the elevated level Sp3o for the bath E3. The vibrator V3, which is not shown in greater detail in terms of its function, is thereby rotatably centered in the cover De3 by a trunnion or bearing Z which also allows raising and lowering of the conveyor to a slight degree. The structure of the vibrator V3 utilizes a motor having at least one eccentrically mounted flywheel and this arrangement is mounted at an angle to the axis of the shaft or column Ts3 to impart the helical movement. The structure of the vibrator V3 is discussed in greater detail in our copending U.S. patent application, Ser. No. 880,079, filed June 30, 1986.

The bulk goods G are cathodically connected via the conveying track F3 and the conveying track F3 is connected to a minus pole of an external voltage or electrical source via the carrying column Ts3 and a connection means (not shown). The tank W3 has a helical anode A3, which is arranged at a distance from the helical conveying track F3 and is only illustrated in the upper turns of the track for purposes of illustration. The fastening of the anode A3 which can also be composed of a plurality of helical segments occurs via anode carriers At3 which extend the length of the tank, although they are only illustrated as extending in the upper regions for purposes of illustration. The anode carriers At3 are connected to the plus pole of the external voltage or electrical source via a cable Kb and a gastight and electrical insulating feed through connector Df.

Spray means Se3 of which only one is illustrated are arranged above the lower level Sp3u of the electrolyte or bath E3 and the spray means Se3 will spray a solution To of toloul onto the goods in the upper portion of the track F3 during the discharging or unloading operation. Vapors of the solution To are condensed by means Ke3 and collected in a collecting channel Sr3 to be supplied to the spray means Se3. The spraying of the solution To will rinse the electrolyte residues off of the goods G.

The apparatus 101 in the drawings is charged batchwise with the goods G and is operated with the goods in circulation until the aluminum deposit has reached the desired layer thickness. Subsequently thereto, the electrolyte bath E3 is lowered to the lower level Sp3u, the switch We is thrown to the second position with the simultaneous removal of the cover D from the opening of the discharge pipe Fr31 so that the fully aluminized goods G which have been cleaned with the assistance of the spray means Se3 can be discharged from the apparatus. As a result of the circulating operation involving one or more return passes, a significantly lower structural height can be utilized in the apparatus 101 than in those apparatuses utilizing a single pass.

Although various minor modifications may be suggested by those versed in the art, it should be understood that we wish to embody within the scope of the patent granted hereon, all such modifications as reasonably and properly come within the scope of our contribution to the art.

We claim:

1. In an apparatus for electrolytic surface treatment of bulk goods, said apparatus comprising a tank for the acceptance of a treatment bath, at least one vibratory conveyor being positioned in the tank and having a helically ascending conveyor track for the transport of goods through the treatment bath from a starting region of the conveyor to a discharge end of the conveyor, said tank having feed means for introducing goods from outside the tank onto the starting region and discharge means for receiving goods from the discharge end and removing them from the tank, means for electrically contacting the goods to a polarity of one pole of a voltage source, and at least one electrode arranged in the treatment bath and having a polarity opposite to the polarity of the one pole, the improvement comprising return means for selectively returning the bulk goods from a discharge end of the vibratory conveyor to a starting region of said conveyor, and switch means for selectively connecting the discharge end to one of the return means and discharge means so that the goods can be passed through the treatment bath more than one time before being discharged from the tank.

2. In an apparatus according to claim 1, wherein the return means is constructed as a gravity conveyor.

3. In an apparatus according to claim 2, wherein the gravity conveyor is formed by a downpipe.

4. In an apparatus according to claim 1, wherein the conveyor track of the vibratory conveyor has at least one descending step as seen in the conveying direction.

5. In an apparatus according to claim 1, wherein the conveyor track is conducted above a lower level of the treatment bath.

6. In an apparatus according to claim 5, which includes spray means for spraying a solvent compatible with the treatment bath, said spray means being arranged above the lower level of the treatment bath for spraying goods on the upper end of the conveyor track.

7. In an apparatus according to claim 6, which includes the tank being closed gas-tight and having means for charging the space above the level of the treatment bath with an inert gas.

8. In an apparatus according to claim 7, which includes condensation means being arranged in the space above the treatment bath, and said solvent for the spray means being taken from the condensation means and supplied to said spray means.

9. In an apparatus according to claim 1, wherein said conveyor track is connected to a carrier column, said carrier column having means to place the column and conveyor track in vibration 10. In an apparatus according to claim 9, wherein the carrier column is actually arranged in the center of the helically ascending track.

11. In an apparatus according to claim 10, wherein the carrier column is arranged on a carrier plate vibrationally mounted in the bottom of the tank and is connected to a vibrator.

12. In an apparatus according to claim 11, wherein the vibrator is positioned at the upper end of the carrier column and has a bearing on its upper surface engaged in a bearing to rotatably center the column relative to the top of the tank with a slight raising and lowering.

13. In an apparatus according to claim 12, wherein the tank is covered, said bearing of the top of the tank being mounted on said cover so that the tank is air tight.

14. In an apparatus according to claim 1, wherein said discharge means includes a downpipe.

15. In an apparatus according to claim 1, which includes means for raising and lowering the level of the treatment bath between an upper level used during the operation of the return means and a lower level used during the discharge of the goods from the tank of the apparatus through the discharge means.

16. In an apparatus according to claim 15, wherein discharge means includes a downpipe having an opening for receiving the goods at a level above the lower level for the treatment bath.

17. In an apparatus according to claim 16, wherein the opening of the downpipe of the discharge means is provided with means for covering the opening when the bath level is at the upper level, said means for covering having means for removing the cover and shifting a switch of the switch means from a position returning the goods to the return means to a second position discharging the goods into the opening of the downpipe.

18. In an apparatus for electrolytic surface treatment of bulk goods, said apparatus comprising a tank for the acceptance of a treatment bath, discharge means for removing goods from the tank, at least one vibratory conveyor having a helically ascending conveyor track for the transport of goods through the treatment bath, means for electrically contacting the goods to a polarity of one pole of a voltage source, and at least one electrode arranged in the treatment bath and having a polarity opposite to the polarity of the one pole, the improvement comprising return means for selectively returning the bulk goods from a discharge end of the vibratory conveyor to a starting region of said conveyor so that the goods can be passed through the treatment bath more than one time, and means for raising and lowering the level of the treatment bath between an upper level used during the operation of the return means and a lower level used during the discharge of the goods from the tank of the apparatus through the discharge means.

19. In an apparatus according to claim 18, wherein discharge means includes a downpipe having an opening for receiving the goods at a level above the lower level for the treatment bath.

20. In an apparatus according to claim 19, wherein the opening of the downpipe of the discharge means is provided with means for covering the opening when the bath level is at the upper level, said means for covering having means for removing the cover and shifting a switch of the return means from a position returning the goods to the lower region of the conveyor track to a second position discharging the goods into the opening of the downpipe.

* * * * *